April 21, 1959  A. S. PATER ET AL  2,883,040
MONOLITHIC POROUS FILLER FOR CYLINDERS AND
METHOD OF PRODUCING SAME
Filed April 27, 1953  2 Sheets-Sheet 2
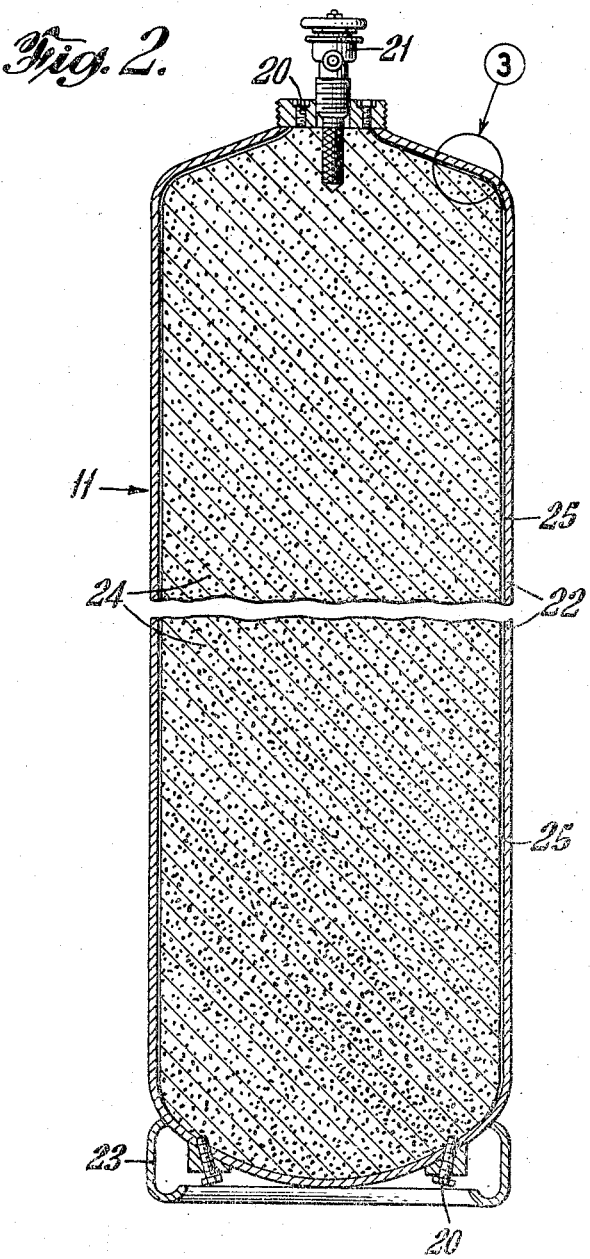
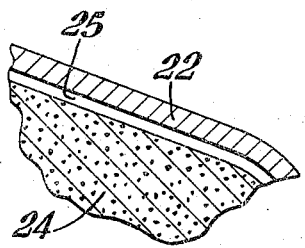
INVENTORS
ANTON S. PATER
JOHN W. HOUSER

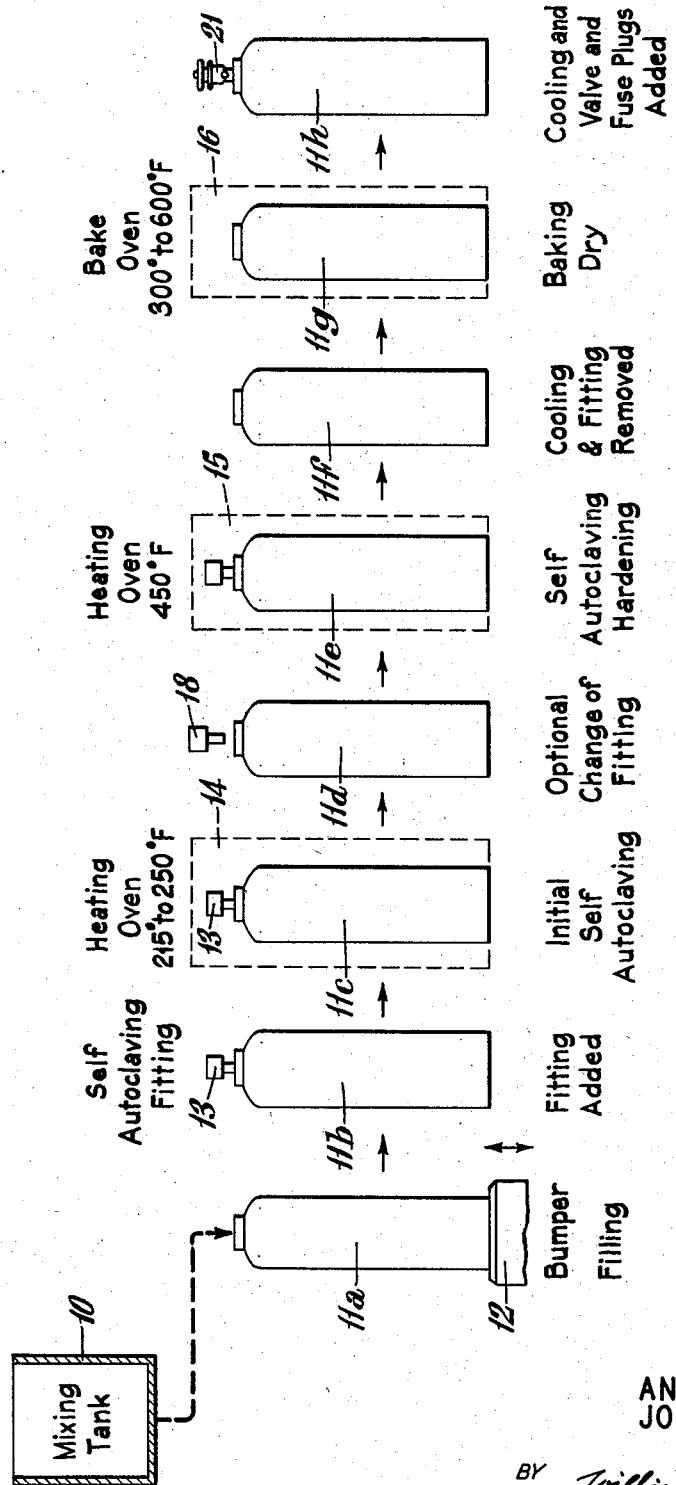

2,883,040
MONOLITHIC POROUS FILLER FOR CYLINDERS AND METHOD OF PRODUCING SAME

Anton S. Pater, Clarence, N.Y., and John W. Houser, Brownsburg, Ind., assignors to Union Carbide Corporation, a corporation of New York Application April 27, 1953, Serial No. 351,478

10 Claims. (Cl. 206—.7)

This invention relates to an improved porous filler mass for containers used for the storage of gas materials such as dissolved acetylene and to a process for manufacturing such containers.

The present invention may be said to be an improvement on that of United States Patent No. 2,422,251 which describes a filler mass composition for acetylene containers comprising mainly a calcium silicate product of chemical interaction in the presence of water between lime hydrate and finely divided silica. Such a composition, which may also include a mineral fiber, when set and hardened within a container, provides a monolithic filler having desirable properties such as a density of 24 to 30 lbs. per cubic foot, a porosity of 80 to 86%, adequate strength so that the mass will not settle and develop voids when the container is subject to rough handling, and uniformly distributed very fine pores providing high resistance to decomposition of a gas contained therein. Reduction of the weight of a shipping container and increase of the porosity of the filler mass provide economic benefits in that a greater amount of gas can be shipped at a reduced shipping cost, but such benefits should not be obtained at a sacrifice of safety and durability.

A principal object of the present invention is to provide an improved gas container filler mass of lighter weight and increased porosity without a sacrifice of safety and durability of the gas storage container. More specifically, objects of the present invention are: to provide an improved filler mass for gas storage containers comprising mainly calcium silicate which has a porosity exceeding 86% while at the same time having uniformly distributed very fine pores and a strength adequate to withstand commercial use without settling or formation of voids; and a method of manufacturing gas storage cylinders having such a filler mass.

Other objects and features of this invention will become apparent from a consideration of the following description.

It has been discovered that it is possible to produce commercially an acetylene cylinder filler with a porosity of 90% or more, which also possesses sufficient strength and ruggedness to withstand rough handling for a long period of use. The increased porosity is highly desirable because more gas can be stored in the cylinder and because the tare weight of the package is smaller. For a given size of cylinder, if the filler porosity is increased from 80% to 90%, for example, the amount of solid material in the cylinder filler is halved. It was known that the water content of the slurry charged into the cylinders affects the porosity of the final product, but it was found that mere increase of the water content would not produce a satisfactory filler, since voids and soft strata in the upper parts of the cylinders resulted when the water content was increased in an attempt to attain higher final porosity.

The difficulties were overcome by modifying the process of manufacture and the composition. Among the more important modifications according to the invention are: the use of a suspending agent to keep the slurry charged into the cylinders in a homogeneous condition for sufficient periods of time to permit economical manufacture; and means whereby the initial curing reaction may occur in the cylinder shells such that a preliminary bulk cooking operation is avoided. This appears to provide an advantage in that the structures formed during initial reaction are not partially destroyed by the handling that is required when the filler mixture is transferred to the cylinders only after a preliminary bulk cooking operation.

Various suspending agents may be used, and examples of suitable inorganic suspending agents are: fresh aluminum and magnesium hydroxides, aluminum sulfate, sodium carbonate with a trace of sulfate, sodium aluminate, basic magnesium carbonate, phosphoric acid or a phosphate, boric acid or a borate, and certain clays such as bentonite. Mixtures of these materials may also be used. The amount and type of suspending agent to be used should be merely sufficient to keep the slurry from settling or stratifying before it becomes set, and also insufficient to detract from the desired physical properties of the final filler structure. While bentonite is an example of a suspending agent, it is found that bentonite does not contribute particularly to the strength of the finished product, so that only a relatively small amount is used.

In order to produce a cylinder filler mass having the desirable properties mentioned and a porosity between 86% and 93%, the ingredients to be used on the dry basis are: quick lime and silica in the proportion of ten parts of lime as CaO to between 10 and 15 parts of finely divided silica as $SiO_2$; an inorganic suspending agent in an amount between 1.8 and 6.5 parts by weight to 10 parts of lime, and inert mineral fiber between 1 and 10 parts by weight to 10 parts of lime.

This may be stated in the form of percentage composition by weight on the dry mix basis to provide the silica to lime ratio limits of 1 to 1.5 respectively:

|  | Percent |
|---|---|
| Lime | 44 to 25.2 |
| Silica | 44 to 37.8 |
| Suspending agent | 8 to 16.5 |
| Asbestos fiber | 4 to 20.5 |
|  | 100    100.0 |

It may be noted that the minimum and maximum values of suspending agent and asbestos are not necessarily employed with the minimum and maximum silica to lime ratios respectively. A composition which was found to provide excellent properties expressed as parts by weight on the dry basis comprises:

| | |
|---|---|
| Lime | 10 |
| Silica | 12 to 13 |
| Suspending agent | 2.5 to 3 |
| Asbestos | 2.5 to 3 |

When such a mixture of ingredients, the proportions of which may vary as indicated, is processed according to the invention as hereinafter described, a cylinder filler mass having a porosity of about 91% is produced when employing water in the amount of 11 to 12 pounds per 1 pound of lime.

The amount of water may be varied within limits to obtain a desired porosity of the final product within the specified range of 86% to 93%. With the dry mix of silica to lime ratio of 1 and minimum amounts of suspending agent and mineral fiber, the range of the water needed would be between 6.7 and 10.3 pounds per pound of lime while with the silica to lime ratio of 1.5 with maximum suspending agent and asbestos addition, the water requirement would be from 10.7 to 18.7 pounds per pound of lime. The total water range is thus from 6.7 to 18.7 pounds per pound of lime for the dry ingredient and final porosity ranges.

The silica preferably is mainly a finely ground crystalline silica of particle size about 200 mesh or smaller. The silica may also include some very fine particle size silica or a portion of amorphous silica. It has been found that very fine particle size silica and amorphous silicas are more highly reactive and that when they are included, the amount of suspending agent used may be reduced. The highly reactive silica may be powdered silica of smaller particle size than that which just passes through a 300 mesh screen and silica type diatomaceous earths are suitable amorphous highly reactive silicas.

When amorphous silica is included, a preferred proportion of ingredients, expressed as parts by weight dry, may be:

| | |
|---|---|
| Lime | 10 |
| Total silica | 12 to 14 |
| (½ to ⅗ of the silica being diatomaceous earth) | |
| Aluminum sulphate | 1.8 to 2.5 |
| Asbestos | 1 to 3 |

The total amount of water for the above ingredients should be between 10 and 12 pounds per pound of lime, which will provide a finished filler mass having a porosity from 90% to 93% and an apparent or bulk density between 12 and 18 pounds per cubic foot.

The mineral fiber should be a material that is inert under the conditions of the manufacturing process so that it does not lose its fibrous character by substantial reaction with the other ingredients. Asbestos is a preferred mineral fiber and it should be in loosely shredded form. Commercial types of asbestos are quite satisfactory, such as chrysotile, and it has been found that when the type known as amosite is used the smaller proportions thereof are preferable.

The silica and lime may contain minor impurities which may result in the presence of a small amount of alumina of the order of ½% or less in the final product due to such impurities, but when a preferred alumina-containing suspending agent is employed, such as bentonite or aluminum sulphate, the final product will have an appreciable content of aluminum compound measurable as alumina. On a dry basis the finished filler mass will then contain aluminum compounds measurable as aluminum oxide in the amount of from 1% to 5% by weight.

In the drawing, Fig. 1 shows diagrammatically the successive positions of a cylinder through the steps of an exemplary process of producing an acetylene cylinder according to the invention;

Fig. 2 is a view of a longitudinal section through a completed cylinder; and

Fig. 3 is a fragmentary section on an enlarged scale to show a clearance space between the upper portion of a cylinder shell and the finished filler mass.

The process of manufacturing a cylinder may begin with the slaking of the lime with part of the water at an elevated temperature in order to provide fine particle size lime slurrry which is then cooled. The inorganic suspending agent is mixed with the balance of the water and the resulting slurry or solution is mixed with the cooled lime slurry. The remainder of the dry ingredients are added to the cool combined slurries while the mixture is stirred in a suitable mixing tank 10, the stirring being continued to provide complete mixing. The mixture is then charged into the cylinders as indicated at position 11a. This may be done by forcing it into the cylinders under pressure or, preferably, by evacuating the cylinders and running the mixture into them. Preferably the cylinders may be continuously evacuated at the top while the slurry is being charged into the cylinders. It may also be desirable to agitate the cylinders during the charging, such as by bumping them on a bumper 12.

In any event, it is important that the cylinders be completely filled with a homogeneous slurry mixture so that no air pockets or void spaces remain.

The filled cylinders should not stand before further processing for a long enough time to incur the possibility of any substantial settling of the solid ingredients of the mixture at the upper ends of the cylinders, times up to one hour being considered not detrimental, and shorter times being preferable.

It is then necessary to cause the reaction between the silica and lime to proceed at an economical rate and this can be done by heating. Heating to temperatures above 212° F. to precook the mixture in the cylinders would cause loss of portions of the mixture from the cylinder openings. According to the invention such loss is avoided and the reaction is accelerated by effecting a combined precooking and autoclaving operation.

To this end each cylinder is provided with a suitable autoclaving fitting shown generally at 13 secured in the opening of the filled cylinder in position 11b, such as an expansion chamber fitted tightly to the filling opening at the top of each cylinder. Such closed expansion chamber, initially filled with air, receives expanded liquid from the cylinder that will compress the air and steam in the chamber, thus allowing the steam pressure in the cylinder to rise to a desired value without incurring the risk of damage to the cylinder shell by hydraulic expansion.

The intra-cylinder autoclaving operation may be carried out by placing the cylinders with expansion chambers in an oven, represented by broken line 14, and heating them at increasing temperature to a maximum temperature of from 375° to 450° F. The mixture, which is initially held in suspension by the aid of the suspending agent until reaction proceeds sufficiently to cause setting of the mass, will continue to react under the influence of the increasing temperature and the increasing pressure corresponding to steam pressure until the reaction and hardening are completed in an economical period of time. When the preferred proportions of ingredients are used, a preferred temperature and time may be about 225° F. for about 18 hours followed by a second treatment in an oven 15 at about 450° F. for two days (48 hours). The cylinders are then removed from the oven 15, cooled, and the expansion chambers are removed as shown at position 11f. The cylinders containing the hardened monolithic mass are then dried out completely by baking in an oven 16, the temperature of which may be initially at about 300° F., the temperature being subsequently gradually increased to a maximum of about 600° F. Under such conditions the cylinders will be dried out in a few days. A preferred baking temperature may be about 450° to 500° F. for about 3 days. The resulting monolithic porous mass 24 in Fig. 2 produced in the cylinders has a porosity between 90% and 93%, a low bulk density of less than 20 pounds per cubic foot, and the crushing strength is very satisfactory, being in excess of 200 pounds and often exceeding 400 pounds per square inch. The cylinders so prepared all withstand the standard bump, flash, and bonfire tests, which are mentioned in the aforesaid patent, column 3, lines 53 to 57.

Instead of closed expansion chambers, other types of autoclaving fitting may be employed. It has been determined that a fitting having a passage therethrough, which passage contains a porous filtering element, may be successfully employed. In one form of autoclaving fitting the passage therethrough is closed by a filter element made of a porous material which has pores small enough to prevent substantial passage of solid ingredients of the slurry mixtures while allowing the passage of water when water is forced out of the slurry-filled cylinders due to hydraulic expansion as the slurry becomes heated.

The filter element employed must have a porosity or permeability and cross-sectional area which provides a desired flow rate that is correlated, within limits, to the size of cylinder with which it is used and the rate of heating. If the flow rate is too small, the cylinder shell may be damaged by exposure to excessive internal pressure because the water cannot be released from the cylinder at a rate such as will maintain a safe pressure as the water in the slurry expands due to the heating during the autoclaving steps. If the flow rate is too large, the desired steam pressure will not be retained in the cylinders for effecting the autoclaving reaction. The flow rate is conveniently predetermined by measurement of air flow through the element at a pressure difference of 50 p.s.i. and at 70° F., being preferably within 2 to 4 cubic feet per hour. For producing cylinders according to a preferred process of the present invention, the autoclave fitting may contain a filter element which is calibrated to provide a flow equivalent to 3.5 to 3.7 cubic feet per hour of air at 70° F. and at a pressure difference of 50 p.s.i. Filter elements so calibrated have been found to provide the proper amount of water release during preset processing from cylinders ranging in volumetric capacity from 2.5 cubic feet down to about 0.45 cubic feet.

The filter element in the autoclaving fitting may be a disk of suitable heat-resistant porous material, for example, a disk of porous metal of the kind made by sintering compressed powdered metal. Another form of autoclaving fitting may comprise a tubular fitting filled or partially filled with slurry mixture of similar composition as that used in the cylinder and which is hardened in position in the tube of the fitting prior to the development of pressure in the cylinder when it is heated. Such a plug is porous enough to allow escape of water while preventing substantial loss of solid materials from the cylinder prior to the setting up of the mixture into a monolithic mass.

When using the autoclaving fitting containing a filter element, the hardening process may be carried out in two stages as follows, referring again to Fig. 1. The cylinder shells 11a, completely filled with slurry mixture and completely sealed except for the vents through the filter elements in the autoclaving fittings 13, are placed in a cool oven 14 which operates at substantially atmospheric pressure. The oven is heated to subject the cylinders to a temperature of between 215° and 250° F. for about 18 hours. Since the heat penetrates to the center of the cylinders gradually, the contents will expand hydraulically at a rate such that the pressure developed will force water out at the autoclaving fittings fast enough to avoid excessive pressures. Such pressure relief, however, is restricted enough to prevent the pressure within the cylinders from dropping below the pressure of steam in equilibrium with water at the temperature of the cylinder contents so that boiling of the cylinder filler mixture is avoided.

After such treatment the cylinder contents are preset and stabilized although not hardened, and the heating can be carried to higher temperatures to accelerate the final hardening. The cylinders may be cooled, as at position 11d, and the autoclaving fittings 13 preferably replaced by similar autoclaving fittings 18 having a flow rate which will release sufficient water to prevent excessive hydrostatic pressure while maintaining the desired steam pressure at higher temperatures. It is found that the filter elements for this autoclaving operation may have a lower flow rate, for example, a flow rate equivalent of 2.2 to 2.4 cu. ft. per hour of air at 70° F. at 50 p.s.i. pressure difference.

The oven temperature for the hardening treatment in oven 16 may be from 400° to 500° F. and continued for about 2 full days. Then after removal of all fittings from the cylinder openings as in position 11f, the cylinders may be baked to dryness in oven 16 as previously described.

The finished cylinder is shown at position 11h where, after cooling, the cylinder may be prepared for use by customary procedures including the addition of fuse plugs 20 and a valve 21 as more clearly shown in Fig. 2 wherein the cylindrical metal shell 22 having bottom and upper fuse plugs 20, a valve 21, and a foot ring 23 is shown substantially completely filled with the monolithic mass 24.

It has been indicated that the finished filler mass 24 fills the cylinder shells 22 and that precautions are taken to avoid the formation of substantial voids. For cylinders to be charged with dissolved acetylene it is very important that any unfilled spaces shall be smaller than the maximum thickness of void space that experience has proved to be safe. Hence excessive shrinkage of the filler mass during hardening and baking must be avoided and the composition and process of the present invention accomplishes this. It is also possible that acetylene cylinders containing a monolithic porous mass comprising mainly calcium silicate can have the mass so completely and tightly filling the cylinder shell that there is no clearance whatever between the inner wall of the cylinder shell and the surface of the mass. Such a condition has been found undesirable because it causes the acetone-charged cylinders to receive gas slower during charging and to release acetylene during use at a slower rate than is desired.

It has been found that a small clearance space, as illustrated at 25 in Fig. 3, between the filler mass 24 and the upper end of the cylinder shell 22 is desirable and that the composition of the filler mass and process of manufacture according to the invention will provide a clearance space 25, the total of which, measured at the ends of the cylinders, will be between 1/64 and 1/8 inch which, when the cylinder is charged with a solvent such as acetone, provides sufficient clearance space to avoid the aforementioned gas taking and discharging difficulties while avoiding excessive clearance space in an acetylene cylinder in use.

The metal containers or cylinders filled with the porous mass according to the invention are useful for the storage and shipping of gases and liquefied gases. They are especially useful for storing and shipping acetylene in the dissolved state, the porous mass containing the proper amount of solvent such as acetone in which the charge of acetylene dissolves. Due to the greater porosity of the improved filler, an economically important increase in the amount of acetylene in a given size cylinder is obtained, resulting in lower distribution costs. This advantage is obtained without sacrifice of durability nor any important increase of cylinder manufacturing costs.

The specific examples set forth hereinabove are given to illustrate the invention, which is not to be limited thereby.

This application is in part a continuation of our application Serial No. 199,575, filed December 6, 1950, and which became abandoned January 2, 1954.

What is claimed is:

1. An acetylene container comprising a closed cylinder shell; a cured and dried monolithic filler mass in said shell comprising mainly calcium silicate in which the ratio of silicon dioxide to calcium as calcium oxide is between 1 and 1.5, said mass also containing between 4 and 20% of an inert mineral fiber, said mass having a porosity from 86 to 93%; a solvent absorbed in the pores of said filler mass; and a clearance space between said solvent-containing filler mass and the inner walls of the shell, which clearance in total thickness is no less than about 1/64 inch and no greater than 1/8 inch.

2. An acetylene container comprising a closed cylinder shell; a cured and dried monolithic filler mass in said shell initially comprising on the dry basis, calcium oxide 10 parts, silica between 10 and 15 parts, a suspending agent between 1.8 and 6.5 parts, and inert mineral fiber between 1 and 10 parts, processed with a total amount of water ranging between 6.7 and 18.7 pounds per pound of calcium oxide, said mass having a porosity from 86 to 93%; and a clearance space between said filler mass and the inner walls of the shell, the total thickness of said clearance space being no less than about 1/64 inch and not greater than 1/8 inch.

3. An acetylene container comprising a closed cylinder shell; a cured and dried monolithic filler mass in said shell having small substantially uniformly distributed pores, a density not greater than 20 pounds per cubic foot, a crushing strength greater than 200 pounds per square inch, and a porosity of over 86% to about 93%, said mass comprising mainly calcium silicate in which the ratio of silica as silicon dioxide to calcium as calcium oxide is from 1 to 1.5 said mass also containing between 4 and 20% of an inert mineral fiber together with minor amounts of other filler modifying material; and a clearance space between the cured and dried filler mass and the inner walls of said shell, the total thickness of said clearance space being no less than about 1/64 inch and not greater than 1/8 inch.

4. A gas package comprising a gas under pressure in intimate contact with and absorbed in the pores of a monolithic mass in a closable container, said mass consisting mainly of calcium silicate, and containing 4% to 20.5% by weight of asbestos fiber, and a suspending agent containing aluminum to provide an aluminum oxide content of from 1% to 5%, said filler mass having a density no greater than 20 pounds per cubic foot, a crushing strength greater than 200 pounds per square inch, and a porosity from 86% to 93%, the pores being uniformly distributed and invisible under substantial magnification; and a clearance space between the filler mass and the inner walls of said shell, the total thickness of said clearance space being no less than about 1/64 inch and not greater than 1/8 inch.

5. A process for making a gas cylinder comprising a closable metal shell substantially filled with a monolithic porous mass consisting essentially of calcium silicate which process comprises providing an aqueous slurry containing fine particle size lime and having incorporated therein fine particle size reactive silica and a non-reactive mineral fiber, the proportions of lime to silica being as 10 parts of calcium oxide to between 10 and 15 parts of silica by weight, the total amount of water being 6.7 to 18.7 lbs. per lb. of lime and the amount of mineral fiber being between 4% and 20% by weight of the total dry solids; stirring such mixture to provide complete mixing while keeping it cool; maintaining the mixture homogeneous during the subsequent steps of filling the shell and initial reaction of the ingredients in the shell; completely filling the shell with such cooled mixture; providing for the escape of only enough liquid from the filled shell to avoid excessive pressure development due to hydraulic expansion; heating the shell and contents to temperatures above 225° F. to promote reaction of the mixture therein while maintaining the internal pressure at a value at least about equal to the equilibrium pressure of steam corresponding to the temperature of heating until the mixture in the shell is set, completing the reaction by heat and pressure; and drying the mass in the shell while allowing free escape of water vapor.

6. In a process for producing an acetylene storage container comprising a gas tightly closable metal shell substantially completely filled with a monolithic porous mass of essentially calcium silicate with a porosity of 86 to 93%, uniformly distributed fine pores and good mechanical strength; the improvement which comprises incorporating in an aqueous slurry of fine particle size lime and fine particle size silica in which the ratio of silica to calcium oxide is from 1 to 1.5 and the total amount of water is from 6.7 to 18.7 pounds per pound of lime, an inorganic suspending agent adapted temporarily to maintain homogeneity during the subsequent steps of filling the shell and initial reaction of the ingredients in the shell; stirring such mixture to provide complete mixing while keeping it cool; filling the shell completely with such cooled mixture; providing for the escape of only enough liquid from the filled shell to avoid excessive pressure development due to hydraulic expansion; heating the shell and contents to a temperature above 215° F. to promote reaction of the mixture while maintaining the internal pressure in the shell at a value at least about equal to the equilibrium pressure of steam corresponding to the temperature of heating until the mixture in the shell is set; completing the reaction under heat and pressure; and then drying the mass in the shell while allowing free escape of water vapor.

7. A process for making a gas cylinder comprising a closable metal shell filled with a monolithic porous mass consisting essentially of calcium silicate, which process comprises slaking lime with warm water to provide a slurry of fine particle size, cooling and combining such slurry with another slurry of an inorganic suspending agent, incorporating silica and a nonreactive mineral fiber, the proportions of lime to silica being as 10 parts of calcium oxide to between 10 and 15 parts of silica by weight, the total amount of water being 6.7 to 18.7 pounds per pound of lime, the amount of said inorganic suspending agent being from 6% to 17% by weight of the total dry solids, and the amount of mineral fiber being between 4% and 20% by weight of the total dry solids, the silica being reactive and finely divided; stirring such mixture to provide complete mixing while keeping it cool; completely filling a cylinder shell with such cooled mixture; providing for the escape of only enough liquid from said shell to avoid excessive pressure development due to hydraulic expansion; heating the cylinder to promote reaction of the mixture therein and further heating the cylinder to a maximum temperature of from 375° to 450° F. to substantially complete the reaction; and then drying the hardened mass in the cylinder at gradually increasing temperatures from 300° F. to about 600° F. while allowing free escape of vapor.

8. A process for making a gas cylinder according to claim 7 in which the heating of the cylinder is effected in stages, the first stage including heating at a temperature of about 225° F. for about 3/4 of a day, the second stage including heating at 375° to 450° F. for about 2 days.

9. A process for making a gas cylinder comprising a closable metal shell filled with a monolithic porous mass consisting essentially of calcium silicate, which process comprises slaking lime with warm water to provide a slurry of fine particle size, cooling and combining such slurry with another slurry of an inorganic suspending agent, incorporating silica and a nonreactive mineral fiber, the proportions of lime to silica being as 10 parts of calcium oxide to between 10 and 15 parts of silica by weight, the total amount of water being 6.7 to 18.7 pounds per pound of lime, the amount of suspending agent being from 6% to 17% by weight of the total dry solids, and the amount of mineral fiber being between 4% and 20% by weight of the total dry solids, the silica being reactive and finely divided; stirring such mixture to provide complete mixing while keeping it cool; completely filling a cylinder shell with such cooled mixture; completely sealing said filled shell except an opening at the upper end; providing at said opening for the escape of substantially liquid only at a flow rate during subsequent heating which is sufficient to avoid excessive pressure development due to hydraulic expansion and which is slow enough to maintain the internal pressure in the shell at a value at least equal to the equilibrium pressure of steam corresponding to the temperature of heating; heating the cylinder to promote reaction of the mixture at a temperature between about 215° and 250° F. until the mixture in the shell is set; further heating the cylinder to a maximum temperature of from 375° to 450° F. to substantially complete the reaction; and then drying the hardened mass in the cylinder at gradually increasing temperatures from 300° F to about 600° F. while allowing free escape of vapor.

10. A process for making a gas cylinder comprising a closable metal shell filled with a monolithic porous mass consisting essentially of calcium silicate, which process comprises slaking lime with warm water to provide a slurry of fine particle size, cooling and combining such slurry with another slurry of an inorganic suspending agent, incorporating silica and a nonreactive mineral fiber, the proportions of lime to silica being as 10 parts of calcium oxide to between 10 and 15 parts of silica by weight, the total amount of water being from 6.7 to 18.7 pounds per pound of lime, the amount of said inorganic suspending agent being from 6% to 17% by weight of the total dry solids, and the amount of nonreactive mineral fiber being between 4% and 20.5% by weight of the total dry solids, the silica being mainly finely divided particle size of 200 mesh or smaller; stirring such mixture to provide complete mixing while keeping it cool; filling a cylinder shell with such cooled mixture; providing communication between the top of the cylinder and an expansion chamber, the cylinder being otherwise closed; heating the cylinder to promote reaction of the mixture in the cylinder at increasing temperatures such that a steam pressure is maintained in the cylinder and expansion chamber and continuing the heating at a maximum temperature of from 375° to 450° F. to substantially complete the reaction; and providing free release of vapor from the cylinder while drying the cylinder at gradually increasing temperatures from 300° F. to about 600° F.

References Cited in the file of this patent

UNITED STATES PATENTS

| | | |
|---|---|---|
| 2,215,891 | Thomson et al. | Sept. 24, 1940 |
| 2,326,516 | Brown | Aug. 10, 1943 |
| 2,422,251 | O'Brian et al. | June 17, 1947 |
| 2,456,643 | Napier | Dec. 21, 1948 |
| 2,486,133 | Egger | Oct. 25, 1949 |
| 2,540,354 | Selden | Feb. 6, 1951 |
| 2,576,610 | Kunzog | Nov. 27, 1951 |
| 2,602,754 | Abraham | July 8, 1952 |